United States Patent
Lin et al.

(10) Patent No.: US 7,181,326 B2
(45) Date of Patent: Feb. 20, 2007

(54) ACTIVE FRONT STEER CONTROL FOR VEHICLE STABILITY ENHANCEMENT

(75) Inventors: William C. Lin, Troy, MI (US); Youssef A. Ghoneim, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 161 days.

(21) Appl. No.: 11/017,412

(22) Filed: Dec. 20, 2004

(65) Prior Publication Data

US 2006/0136112 A1 Jun. 22, 2006

(51) Int. Cl.
*G06F 19/00* (2006.01)
*B62D 6/00* (2006.01)

(52) U.S. Cl. .................. 701/41; 701/42; 180/443
(58) Field of Classification Search .............. None
See application file for complete search history.

(56) References Cited

U.S. PATENT DOCUMENTS

| | | | | |
|---|---|---|---|---|
| 4,767,588 A | * | 8/1988 | Ito | 701/41 |
| 5,386,365 A | * | 1/1995 | Nagaoka | 701/44 |
| 5,732,377 A | * | 3/1998 | Eckert | 701/83 |
| 5,746,486 A | | 5/1998 | Paul et al. | |
| 5,774,819 A | * | 6/1998 | Yamamoto et al. | 701/41 |
| 6,456,920 B1 | * | 9/2002 | Nishio et al. | 701/70 |
| 6,671,595 B2 | * | 12/2003 | Lu et al. | 701/36 |
| 6,895,318 B1 | * | 5/2005 | Barton et al. | 701/42 |
| 2003/0221899 A1 | * | 12/2003 | Bedner et al. | 180/446 |

\* cited by examiner

*Primary Examiner*—Michael J. Zanelli
(74) *Attorney, Agent, or Firm*—Kathryn A. Marra

(57) ABSTRACT

An AFS control system that combines and weights yaw rate feedback and side-slip rate feedback to provide increased vehicle stability enhancement control. The AFS system includes a yaw rate sub-system that generates a desired yaw rate signal. The AFS system also includes a side-slip rate sub-system that generates a desired side-slip rate feedback signal. The AFS system further includes a side-slip rate feedback sub-system that generates a side-slip rate feedback signal. The AFS system also includes a yaw rate feedback sub-system that generates a yaw rate feedback signal. The yaw rate feedback signal and the side-slip rate feedback signal are integrated in a control integration sub-system that generates a stability enhancement control signal. The control integration sub-system determines whether the vehicle is in an oversteer or understeer condition, and weights the desired yaw rate feedback signal accordingly based on the vehicle condition.

20 Claims, 6 Drawing Sheets

ACTIVE FRONT STEER CONTROL FOR VEHICLE STABILITY ENHANCEMENT

BACKGROUND OF THE INVENTION

1. Field of the Invention

This invention relates generally to an active front steer vehicle control system and, more particularly, to an active front steer vehicle control system that integrates and weights both yaw rate feedback and side-slip rate feedback.

2. Discussion of the Related Art

Modern vehicles sometimes incorporate active vehicle control systems. One such system is known as a vehicle stability enhancement (VSE) system that assists the vehicle operator in providing vehicle handling on surfaces such as wet or uneven pavement, ice, snow or gravel. The VSE system typically senses wheel skid based on inputs from a wheel speed sensor, a steering angle sensor, a vehicle speed sensor and a vehicle yaw rate sensor. The VSE system uses these inputs to reduce engine torque and apply differential braking to help maintain the vehicle travel along the intended path.

Additionally, active chassis control systems have been emerging in the art that are used in combination with VSE systems. The chassis control systems typically include differential braking control, real-time suspension damping, rear-wheel steering and active front steering control. With the capability of controlling chassis dynamics in real time, the active chassis control systems can be used to enhance the vehicle handling performance.

Another active vehicle control system is known as an active front steering (AFS) system that provides automatic front-wheel steering. AFS systems typically employ a steering actuator system that receives an operator intended steering signal from a hand-wheel sensor, a vehicle speed signal and a vehicle yaw rate signal, and provides a correction to the operator steering signal to cause the vehicle to more closely follow the vehicle operator's intended steering path to increase vehicle stability and handling. The AFS system is able to provide steering corrections much quicker than the vehicle operator's reaction time, so that the amount of operator steering is reduced. The AFS system provides a more direct vehicle steering under normal road conditions at low and medium speeds, reducing operator steering effort. The AFS system also may help to increase vehicle agility in city traffic or during parking maneuvers. The AFS system also provides less direct vehicle steering at higher vehicle speeds.

In a given operating environment, steering stability and performance of a vehicle are largely characterized by the vehicle's understeer and oversteer behavior. The vehicle is in an understeer condition if the vehicle yaw is less than the operator steering input, where turning the steering wheel more does not correct the understeer condition because the wheels are saturated. The vehicle is in an oversteer condition if the vehicle yaw is greater than the operator steering input.

The known methods of yaw-rate feedback control, such as employed by differential braking control, are sometimes not adequate for the active front steer control. When the vehicle fails to attain the desired yaw rate commanded by the vehicle operator to the hand-wheel due to various responses, such as road surface condition, active chassis control will provide a control component to facilitate an increase of the yaw rate for yaw rate feedback control. When applying this control to the active front steering during such a situation, the additional control component that the control system provides will be an additional amount of front wheel steering. However, under certain situations this additional steering input to the front wheels can saturate the front tires under heavy understeer situation, or the vehicle's failure to attain the desired yaw rate as already caused by a heavy understeer induced by the vehicle operator's excessive steering, resulting in an undesired vehicle behavior.

U.S. patent application Ser. No. 10,978,982, titled Method and Apparatus for Controlling Active Front Steering, filed Nov. 1, 2004, assigned to the Assignee of this application and herein incorporated by reference, discloses an AFS system that considers the vehicle understeer and oversteer condition. Improvements to the AFS system disclosed in the '982 application can be provided by considering vehicle lateral dynamics or side-slip.

SUMMARY OF THE INVENTION

In accordance with the teachings of the present invention, an AFS control system is disclosed that combines and weights yaw rate feedback and side-slip rate feedback to provide increased stability enhancement control. The AFS system includes a yaw rate sub-system that generates a desired yaw rate signal based on a hand-wheel angle signal and a vehicle speed signal. The AFS control system also includes a side-slip rate sub-system that generates a desired side-slip rate signal based on the hand-wheel angle signal and the vehicle speed signal. The AFS control system further includes a side-slip rate feedback sub-system that generates a side-slip rate feedback signal based on the desired side-slip rate signal, the vehicle speed signal, an actual vehicle yaw rate signal and a vehicle lateral acceleration signal. The AFS control system also includes a yaw rate feedback sub-system that generates a yaw rate feedback signal based on the desired yaw rate signal and the actual yaw rate signal. The yaw rate feedback signal and the side-slip rate feedback signal are integrated in a control integration sub-system that generates a stability enhancement control signal. The control integration sub-system determines whether the vehicle is in an oversteer or understeer condition, and weights the desired yaw rate feedback signal accordingly based on the vehicle condition.

The side-slip rate feedback sub-system determines whether the vehicle side-slip is great enough for a long enough period of time to provide the side-slip rate feedback signal, otherwise it sets the side-slip rate feedback signal to zero. Also, the side-slip rate feedback sub-system weights the side-slip rate feedback signal depending on whether the vehicle is in the understeer or oversteer condition.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to an AFS control system that integrates both yaw rate feedback and side-slip rate feedback for a vehicle is merely exemplary in nature, and is in no way intended to limit the invention or its applications or uses.

Figure 1:
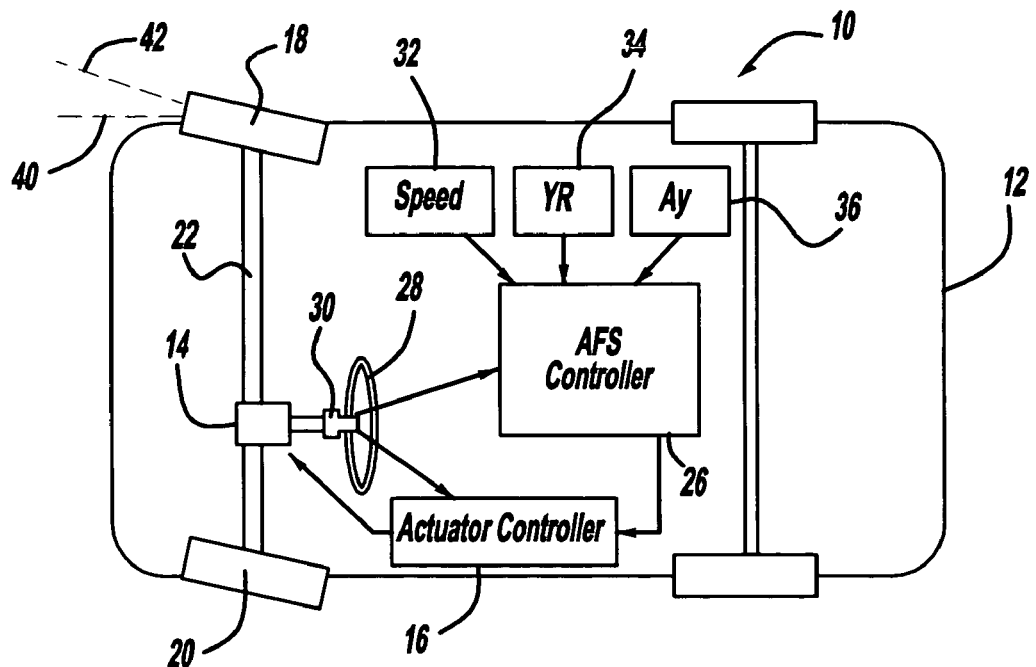
FIG. 1 is a plan view of an active front steering (AFS) system for a vehicle, according to an embodiment of the present invention.

FIG. 1 is a plan view of an AFS control system 10 for a vehicle 12, according to an embodiment of the present invention. The system 10 includes an AFS actuator 14 that receives a steering command signal from an actuator controller 16. The actuator 14 provides actuation of front wheels 18 and 20 of the vehicle 12 coupled to an axle 22. The vehicle 12 includes a hand-wheel 28 that allows the vehicle operator to steer the vehicle 12. A hand-wheel angle sensor 30 provides a hand-wheel angle signal to an AFS controller 26 to provide the vehicle operators steering intention. Additionally, the system 10 includes a vehicle speed sensor 32, a vehicle yaw rate sensor 34 and a vehicle lateral acceleration sensor 36 that provide a vehicle speed signal Vx, a vehicle yaw rate signal YR and a vehicle lateral acceleration signal Ay, respectively, to the controller 26.

The AFS controller 26 provides a steering command signal to the actuator controller 16 for controlling the actuator 14. The system 10 is controlled by the AFS controller 26 to determine the amount of steering angle augmentation, and then commands the AFS actuator 14 to deliver additional steering to the vehicle operator input, if necessary. The control of the AFS actuator 14 is based on the hand-wheel angle position detected by the sensor 30, in addition to the vehicle speed signal Vx, the vehicle yaw rate signal YR and the vehicle lateral acceleration signal Ay.

As will be discussed in more detail below, the actuator 14 provides a steering angle augmentation to the vehicle operator steering command from the hand-wheel 28. For example, the front wheels 18 and 20 could be pointed along line 40 in response to the vehicle operator's turning of the hand-wheel 28 with no action from the AFS actuator 14. However, the vehicle operators intended steering angle may be along line 42. When the AFS actuator 14 is activated, an additional amount of steering angle can be provided to the front wheels 18 and 20 to direct the front wheels 18 and 20 along the line 42 to more closely steer the vehicle 12 to the vehicle operator's intent.

In the active front steering control system disclosed in the '982 application, the AFS controller determines the vehicle's understeer and oversteer condition during vehicle maneuvers, and provides yaw rate feedback control to stabilize the vehicle 12 in difficult maneuvers to enhance the vehicle stability. The amount of the steering angle augmentation in that process is determined by:

$$\Delta \delta_{f\_yr} = \Delta \delta_{f\_us} + \Delta \delta_{f\_os} \quad (1)$$

Where $\Delta \delta_{f\_yr}$ is the steering command signal, $\Delta \delta_{f\_us}$ is an understeer coefficient and $\Delta \delta_{f\_os}$ is an oversteer coefficient. According to the present invention, the AFS control is further enhanced by providing vehicle lateral dynamics to include both a vehicle side-slip rate feedback (SRFD) control and a vehicle yaw rate feedback (YRFB) control.

Figure 2:
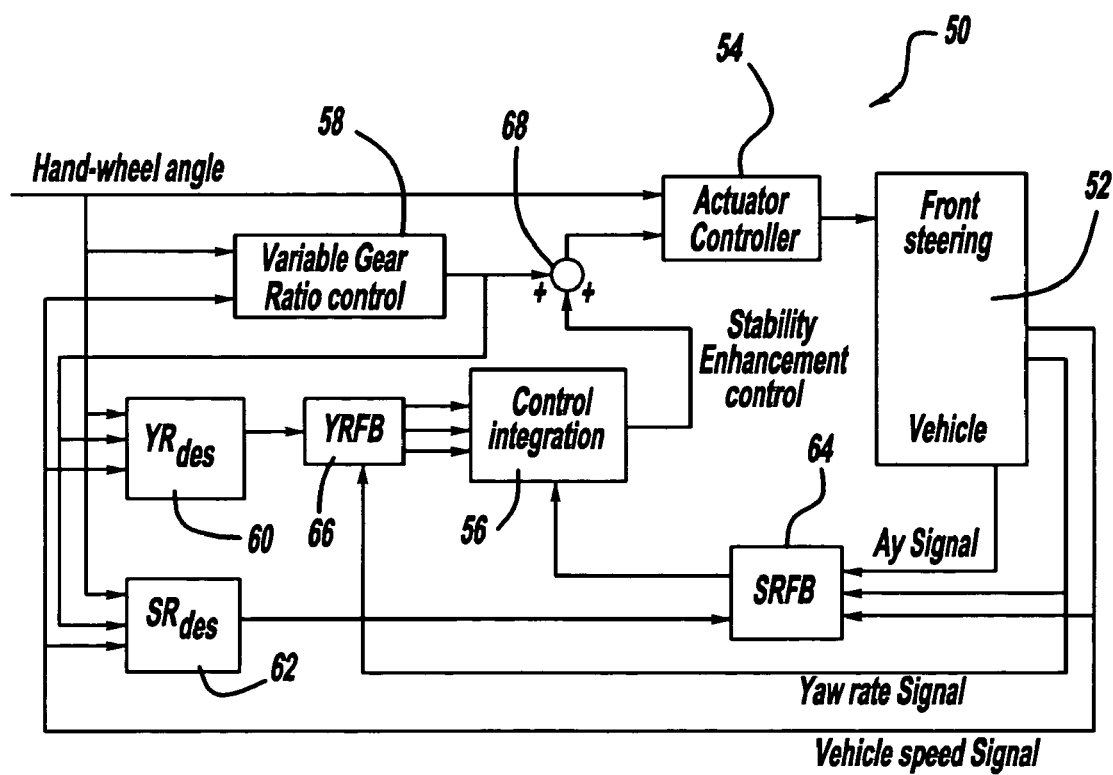
FIG. 2 is a schematic block diagram of the AFS system shown in FIG. 1.

FIG. 2 is a more detailed block diagram of an AFS control system 50 for a vehicle 52, according to an embodiment of the present invention. The system 50 includes an actuator controller 54 (representing the actuator controller 16) that receives a hand-wheel steering signal from the sensor 30 indicating the vehicle operator's intended steering angle. The actuator controller 54 provides a front wheel steering control signal to the vehicle 52.

The system 50 includes a variable gear ratio control process block 58 that generates a variable gear control signal that supplements the hand-wheel angle signal during normal vehicle operation, as is well understood by those skilled in the art. A yaw rate process block 60 generates a desired yaw rate signal based on the hand-wheel angle signal, the output of the variable gear ratio control process block 58 and the vehicle speed signal Vx. A side-slip rate process block 62 generates a desired side-slip rate signal Vy_dot_C based on the hand-wheel angle signal, the output of the variable gear ratio control process block 58 and the vehicle speed signal Vx. The desired yaw rate signal and the desired side-slip rate signal Vy_dot_C from the process blocks 60 and 62, respectively, can be calculated by any process suitable for the purposes described herein. One non-limiting example of calculating a desired yaw rate signal and side-slip rate signal can be found in U.S. Pat. No. 6,122,584 issued Sep. 19, 2000 to Lin et al., assigned to the Assignee of this application and herein incorporated by reference.

The vehicle speed signal Vx, the yaw rate signal YR, the lateral acceleration signal Ay and the desired slip-rate signal Vy_dot_C are applied to a side-slip rate feedback (SRFB) process block 64. The SFRB process block 64 generates a stability enhancement control signal or side-slip rate feedback signal $\Delta \delta f\_Vydot$ that is representative of an error between the desired side-slip rate and the actual side-slip rate. Those skilled in the art will readily recognize known systems for determining the side-slip rate feedback signal $\Delta \delta f\_Vydot$.

The vehicle speed signal Vx and the desired yaw rate signal from the process block 60 are applied to a yaw rate feedback (YRFB) process block 66. The YRFB process block 66 generates a yaw rate feed back signal $\Delta \delta f\_yr$ that is representative of an error between the desired yaw rate and the actual yaw rate. Various systems are known in the art for calculating the yaw rate error in this manner, including the technique disclosed in the '982 application that considers the vehicle under and oversteer conditions. Multiple outputs are provided from the YRFB process block 66 that include the yaw rate feedback error, the understeer condition and the oversteer condition.

The yaw rate feedback signal $\Delta \delta f\_yr$ from the YRFB process block 66 and the side-slip rate feedback signal $\Delta \delta f\_Vydot$ from the SRFB process block 64 are applied to a control integration process block 56. The control integration process block 56 generates an actuator augmentation signal that is added to the variable gear control signal in an adder 68, and the added signal is applied to the actuator controller 54 to enhance the hand-wheel angle signal to steer the front wheels of the vehicle 52, according to the invention.

Figure 3:
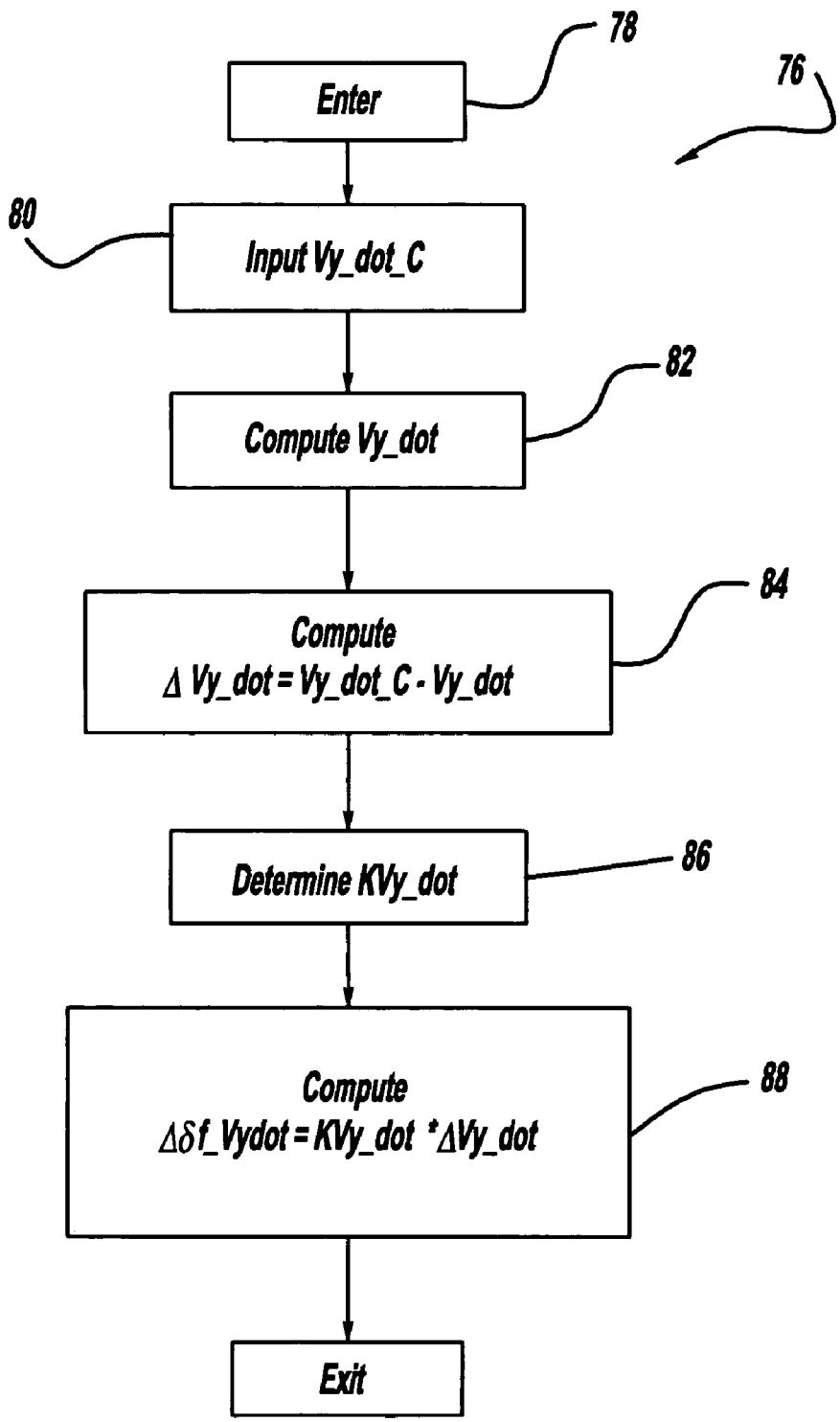
FIG. 3 is a flow chart diagram showing a process for determining a lateral dynamic control or side-slip component for the AFS control system of the invention.

FIG. 3 is a flow chart diagram 76 showing one process for determining how the SRFB process block 64 determines the side-slip rate feedback signal $\Delta \delta f\_Vydot$ for vehicle lateral dynamics. The algorithm enters the process at box 78, and determines the desired vehicle side-slip rate signal Vy_dot_C from the process block 62 at box 80. For the purposes of stability enhancement, the desired side-slip rate signal Vy_dot_C can also be set to zero for a conservative driving maneuver. An actual vehicle side-slip rate Vy_dot is computed at box 82. The actual vehicle side-slip rate Vy_dot cannot be directly measured, but can be computed based on other vehicle chassis sensors. It will be recognized by those skilled in the art that the computation for the actual vehicle side-slip rate Vy_dot can be made using the lateral acceleration signal Ay, the vehicle yaw rate signal YR and the vehicle speed signal Vx as:

$$Vy\_dot = Ay - YR \cdot Vx \quad (2)$$

An error signal ΔVy_dot is calculated at box 84 as the difference between the desired side-slip rate Vy_dot_C and the actual side-slip rate Vy_dot.

Figure 4:
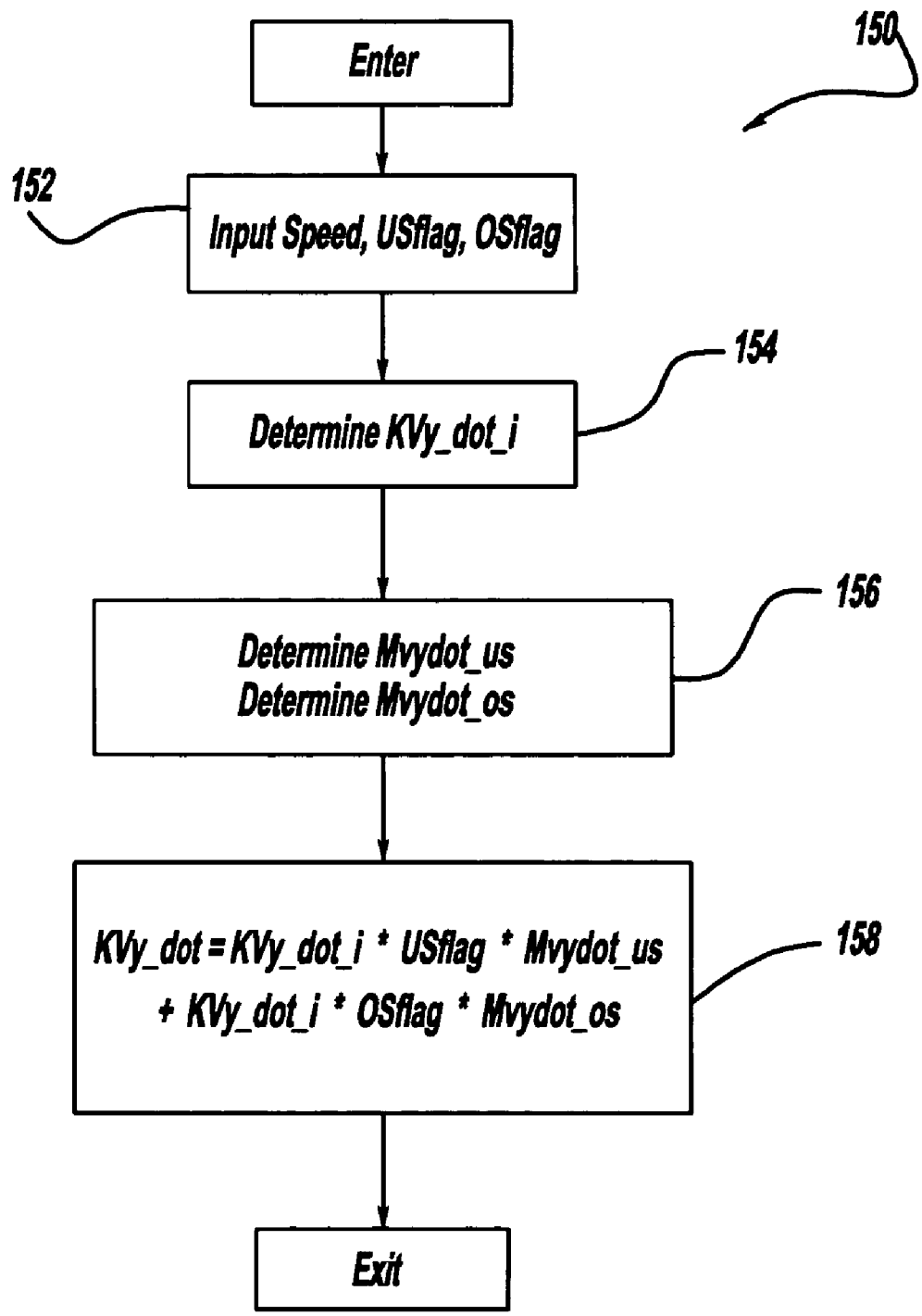
FIG. 4 is a flow chart diagram showing a process for determining a control gain for the side-slip component.

The error signal ΔVy_dot is then multiplied with a side-slip control gain KVy_dot at box 86. FIG. 4 is a flow chart diagram 150 showing a process for calculating the control gain KVy_dot using the vehicle speed signal Vx and the understeer/oversteer condition. The vehicle speed signal Vx, an understeer flag USFLAG and a oversteer flag OSFLAG are input at box 152. The understeer and oversteer flags tell the system 50 whether the vehicle is in the understeer or oversteer condition, respectively. The algorithm then determines an initial control gain KVy_dot_i at box 154. The initial control gain KVy_dot_i is based on a linear analysis of vehicle dynamics, familiar to those skilled in the art, of the vehicle dynamics and control from, for example, a look-up table, such as Table 1 below.

TABLE 1

| | Vx(kph) | | | | | | |
|---|---|---|---|---|---|---|---|
| | 0 | 19 | 43 | 62 | 82 | 96 | 120 |
| Kvy_dot (deg/m/s²) | 0 | 0.042 | 0.069 | 0.13 | 0.158 | 0.16 | 0.165 |

The algorithm further determines the control gain KVy_dot using the understeer/oversteer condition by multiplying the control gain KVy_dot with a multiplier Mvydot for both the understeer and oversteer condition. The algorithm first determines the multiplier Mvydot at box 156. Tables 2 and 3 below give representative examples of the multipliers Mvydot_us and Mvydot_os for the understeer (us) and oversteer (os) condition, respectively. If the vehicle is in the oversteer condition, then KVy_dot=KVy_dot_i*Mvydot_us, and if the vehicle is in the understeer condition, then KVy_dot=KVy_dot_i*Mvydot_os. In another embodiment, a simple logic can be implemented. Particularly, if the vehicle is in the understeer condition, then KVy_dot=0, and if the vehicle is in the oversteer condition, then KVy_dot=KVy_dot_i.

TABLE 2

| | Vx(kph) | | | | | | |
|---|---|---|---|---|---|---|---|
| | 0 | 20 | 40 | 60 | 80 | 100 | 120 |
| Mvydot_us | 0.10 | 0.1 | 0.08 | 0.08 | 0.05 | 0.05 | 0.05 |

TABLE 3

| | Vx(kph) | | | | | | |
|---|---|---|---|---|---|---|---|
| | 0 | 20 | 40 | 60 | 80 | 100 | 120 |
| Mvydot_os | 1.2 | 1.2 | 1.25 | 1.35 | 1.40 | 1.40 | 1.40 |

The algorithm then determines the control gain KVy_dot at box 158. Particularly, KVy_dot=KVy_dot_i*Mvydot_us+KVy_dot_i*Mvydot_os, where one of the understeer or oversteer terms is zero. The side-slip rate feedback signal Δδf_Vydot is then computed at box 88 as KVy_dot*ΔVy_dot.

The side-slip rate feedback signal Δδf_Vydot from the SRFB process block 64 is integrated with the yaw-rate feedback control signal Δδf_yr from the YRFB process block 66 in the control integration process block 56. According to the invention, the control integration process block 56 provides two processes for integrating the signals.

Figure 5:
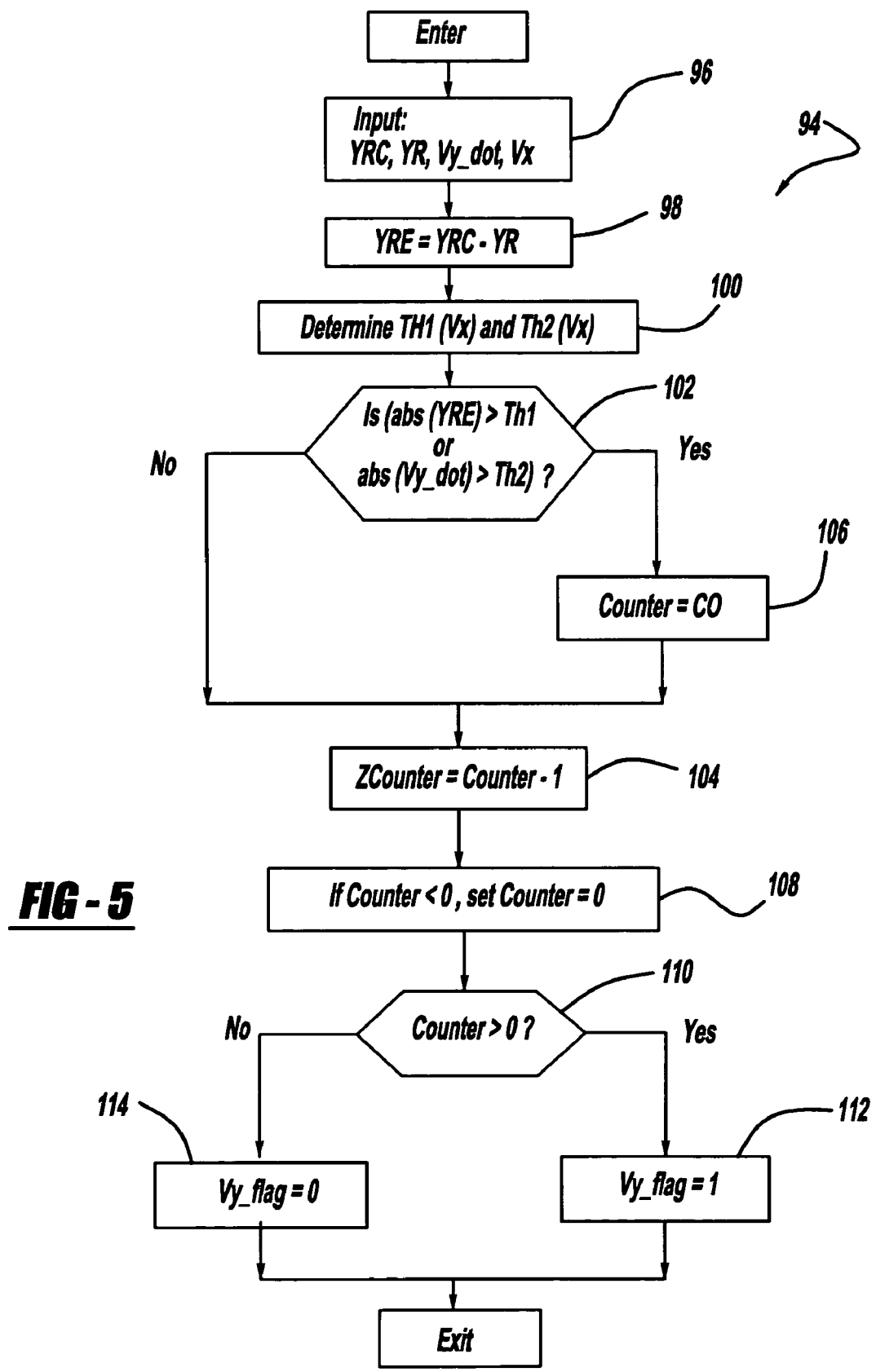
FIG. 5 is a flow chart diagram showing a process for determining whether to activate a side-slip rate feedback component for the AFS control system of the invention.

FIG. 5 is a flow chart diagram 94 to determine the condition upon which the side-slip rate feedback control signal Δδf_Vydot computed by the flow chart diagram 76 needs to be incorporated with the yaw-rate feedback control signal Δδf_yr from the yaw-rate feedback process block 66. In other words, the side-slip rate error may not be severe enough to include the side-slip rate in the vehicle stability enhancement control.

The algorithm used in the flow chart diagram 94 inputs a desired yaw rate command (YRC) signal, the vehicle yaw rate signal YR, the vehicle speed signal Vx and the computed actual vehicle side-slip rate Vy_dot at box 96. The algorithm then determines a yaw rate error (YRE) signal as YRC-YR at box 98. The algorithm then compares the YRE signal and the actual side-slip rate Vy_dot to threshold values Th1 and Th2, respectively, at box 100. The threshold values Th1 and Th2 are functions of the vehicle speed Vx, and can be provided, for example, by look-up tables, such as Tables 4 and 5 below.

TABLE 4

| | Vx(kph) | | | | | | |
|---|---|---|---|---|---|---|---|
| | 0 | 20 | 40 | 60 | 80 | 100 | 120 |
| Th1 (deg/sec) | 4.0 | 5.0 | 7.0 | 6.5 | 6.0 | 5.0 | 4.5 |

TABLE 5

| | Vx(kph) | | | | | | |
|---|---|---|---|---|---|---|---|
| | 0 | 20 | 40 | 60 | 80 | 100 | 120 |
| Th2 (deg/sec) | 3.0 | 5.5 | 7.0 | 8.0 | 7.5 | 7.0 | 6.5 |

A counter or timer is set up in the process discussed herein. At any time when either the YRE signal or the actual side-slip rate Vy_dot exceeds the respective threshold Th1 and Th2, respectively, the counter is loaded with a predetermined value. Particularly, the YRE signal and the actual side-slip rate Vyr_dot must be greater than the predetermined thresholds Th1 and Th2, respectively, for a predetermined period of time before the side-slip rate feedback control signal Δδf_Vydot is integrated in the integration process block 56. For example, a value of CO=2000 can be used to provide a two second period when the control loop is executed every one millisecond. While the counter is non-zero, a lateral acceleration flag Ay_flag is set indicating the need for incorporating the side-slip rate feedback control signal Δδf_Vydot with the yaw-rate feedback control signal Δδf_yr. During the period of time when the counter is counting down, any condition where the YRE signal or the side-slip rate Vy_dot exceeds its threshold Th1 or Th2, respectively, will result in setting the counter to its full count, thus maintaining the condition of the controls integration.

To perform the threshold comparison, the algorithm determines whether the YRE signal is greater than Th1 or whether the vehicle side-slip rate Vy_dot is greater than Th2 at decision diamond 102. If either of these conditions is not met, the algorithm sets a Z counter equal to counter −1 at box 104. If one of these conditions is met at the decision diamond 102, then the algorithm sets the Z counter equal to CO at box 106, and then sets the Z counter equal to counter −1 at the box 104. The algorithm then determines if the Z counter is less than zero at box 108, and if so, sets the Z counter equal to zero. The algorithm then determines whether the count is greater than zero at decision diamond 110. If the count is greater than zero at the decision diamond 110, then the algorithm sets Vy_flag equal to 1 at box 112. If the count is not greater than zero at the decision diamond 110, then the algorithm sets Vy_flag equal to zero at box 114.

Figure 6:
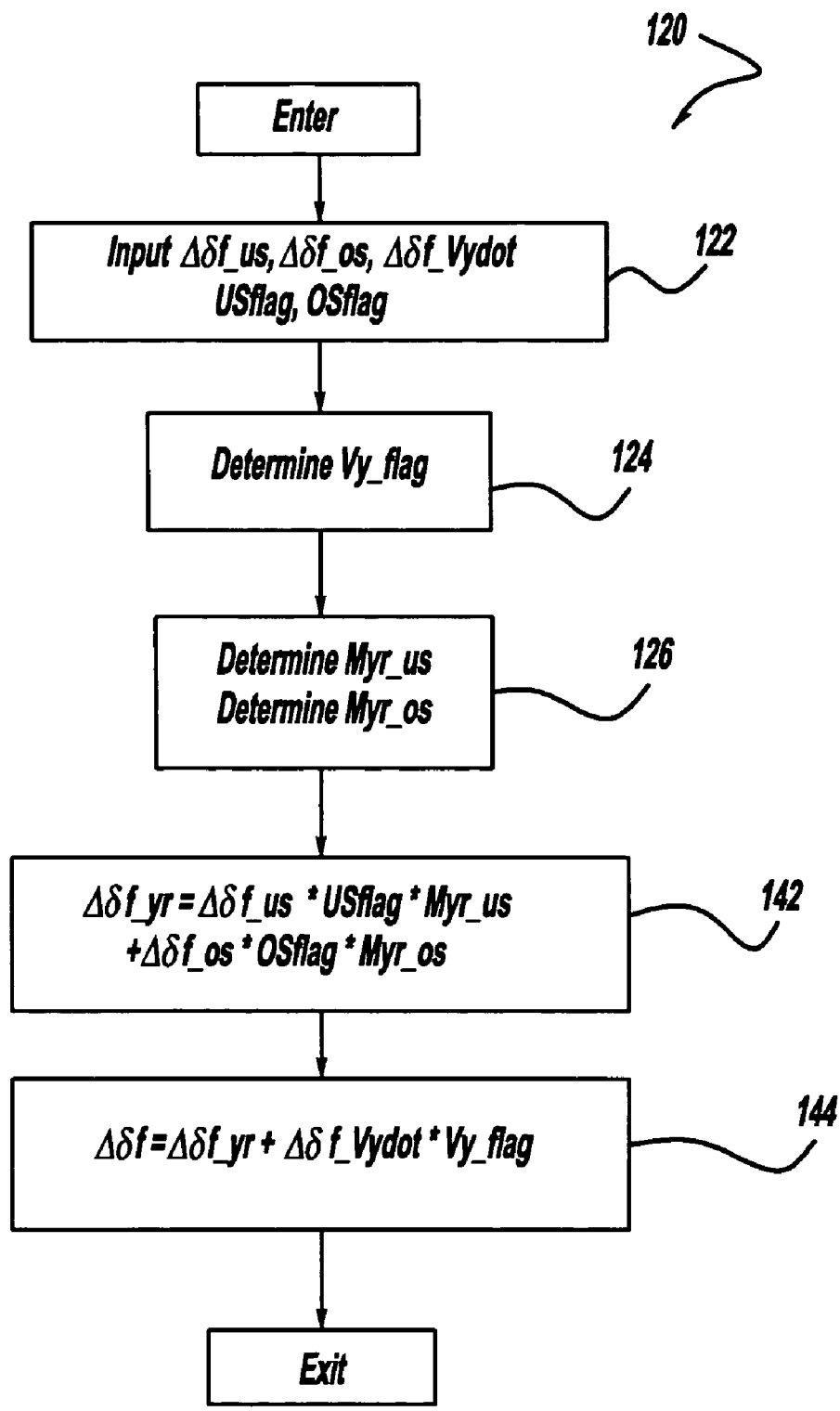
FIG. 6 is a flow chart diagram showing a process for integrating a yaw rate feedback component and the side-slip rate feedback component of the vehicle for the AFS control system of the invention.

FIG. 6 is a flow chart diagram 120 showing a process for integrating the side-slip feedback control signal Δδf_Vydot and the yaw rate feedback control signal Δδf_yr in the control integration process block 56. The various signals applied to the control integration process block 56 are input at box 122, including the understeer flag USFLAG, the oversteer flag OSFLAG, the yaw rate feedback signal for the understeer condition Δδf_us and the yaw rate feedback signal for the oversteer condition Δδf_os from the process block 66 and the side-slip rate feedback signal Δδf_Vydot from the SRFB process block 64. The algorithm then determines whether Vy_flag is equal to zero or one from the flow chart diagram 94 at box 124. The algorithm then uses the vehicle speed signal Vx and the Vy_flag to determine control integration multipliers Myr_us and Myr_os for the understeer and the oversteer condition, respectively, at box 126. The control integration multipliers Myr_us and Myr_os are weighting functions for the understeer and oversteer yaw rate feedback signals Δδf_us and Δδf_os for the understeer and oversteer conditions, respectively. The side-slip rate feedback signal Δδf_Vydot is not weighted because the weighting factor is normalized with the yaw rate feedback multipliers in this design.

Figure 7:
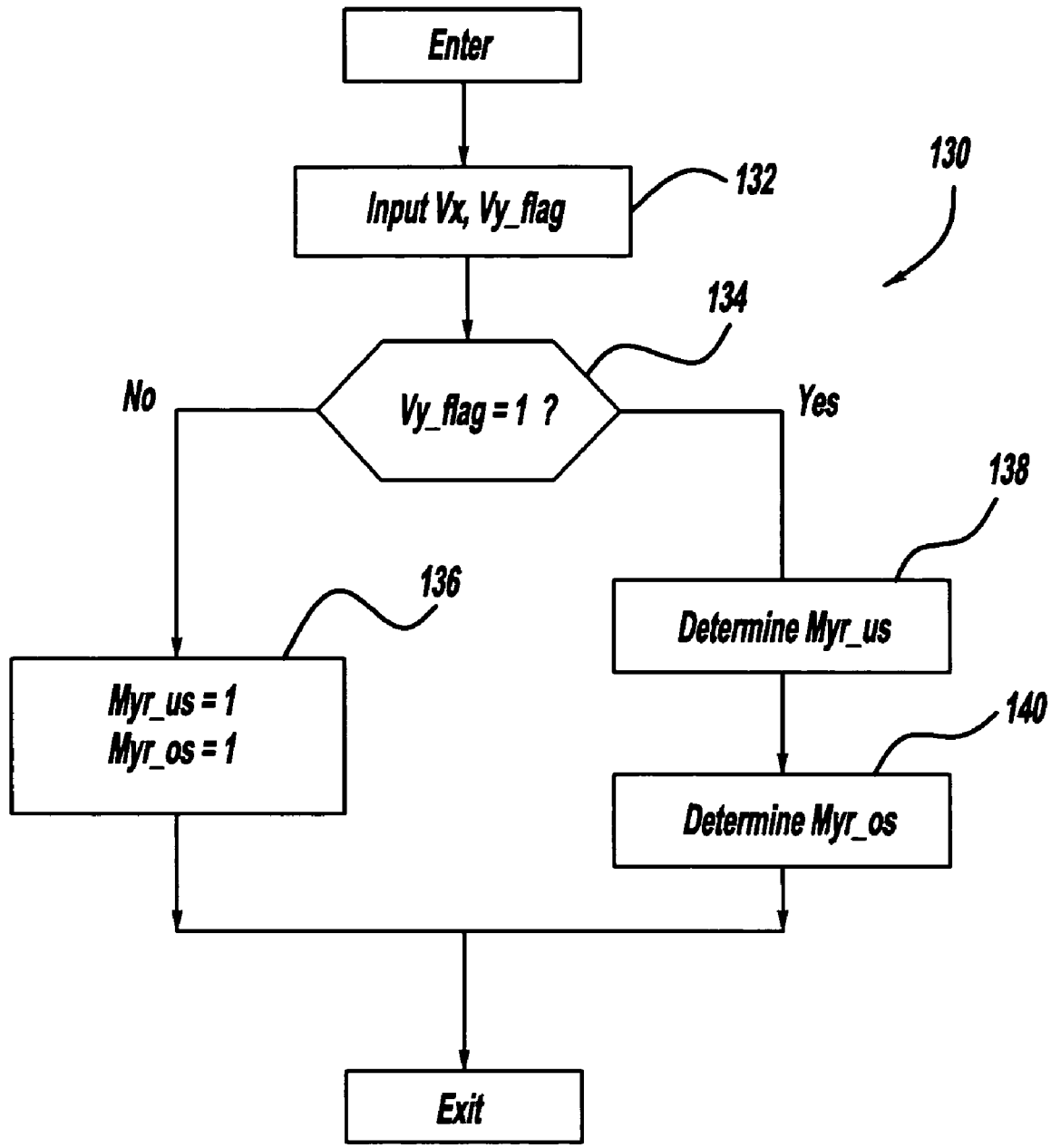
FIG. 7 is a flow chart diagram showing a process for determining multiplication factors for the yaw rate feedback component.

FIG. 7 is a flow chart diagram 130 that shows a process for determining the yaw rate control integration multipliers Myr_us and Myr_os, according to one embodiment of the present invention. The algorithm first inputs the vehicle speed signal Vx and the Vy_flag at box 132. The algorithm then determines whether Vy_flag is equal to one at decision diamond 134, and sets the multipliers Myr_us and Myr_os equal to one at box 136 if the Vy_flag is not equal to one at the decision diamond 134. Particularly, the yaw rate feedback signal Δδf_Vydot is not weighted if the side-slip rate feedback signal Δδf_Vydot is zero. If the algorithm determines that the Vy_flag is equal to one at the decision diamond 134, then the algorithm determines the multipliers Myr_us and Myr_os at boxes 138 and 140, respectively.

Tables 6 and 7 below are exemplary look-up tables that give values for the multipliers Myr_us and Myr_os based on the vehicle speed signal Vx.

TABLE 6

| | Vx(kph) | | | | | | |
|---|---|---|---|---|---|---|---|
| | 0 | 20 | 40 | 60 | 80 | 100 | 120 |
| Myr_us | 0.85 | 0.87 | 0.92 | 0.88 | 0.80 | 0.75 | 0.70 |

TABLE 7

| | Vx(kph) | | | | | | |
|---|---|---|---|---|---|---|---|
| | 0 | 20 | 40 | 60 | 80 | 100 | 120 |
| Myr_os | 0.95 | 0.98 | 1.10 | 1.13 | 0.98 | 0.93 | 0.90 |

Once the multipliers Myr_us and Myr_os are determined from the process in FIG. 7, the algorithm then determines the yaw-rate feedback signal Δδf_yr at box 142 by the equation:

$$\Delta\delta f\_yr = \Delta\delta f\_us * US\_flag * Myr\_us + \Delta\delta f\_os * OS\_flag * Myr\_os \qquad (2)$$

The algorithm then determines the stability enhancement control command Δδf from the control integration process block 56 at box 144 by the equation:

$$\Delta\delta f = \Delta\delta f_{\_yr + \Delta\delta f\_}Vydot * Vy\text{-flag} \qquad (3)$$

One of the understeer flag us_flag and the oversteer flag os_flag will be zero so that one of the terms in equation (2) will be zero.

It is noted that the yaw rate feedback signal Δδf_yr computed according to equation (3) is the same result from equation (1) when Vy_flag is zero, upon which all of the stability enhancement control is performed by the yaw rate feedback.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing active front steering for a vehicle, said method comprising:
   providing a vehicle speed signal of the vehicle;
   providing a lateral acceleration signal of the lateral acceleration of the vehicle;
   providing an actual yaw rate signal of the actual yaw rate of the vehicle;
   providing a steering angle signal indicative of the vehicle operator's desired steering direction;
   determining a desired yaw rate of the vehicle based on the steering angle signal and the vehicle speed signal;
   determining a desired side-slip rate of the vehicle based on the steering angle signal and the vehicle speed signal;
   determining a yaw rate feedback signal based on the desired yaw rate signal and the actual yaw rate signal;
   determining a side-slip rate feedback signal based on the desired side-slip rate signal, the vehicle speed signal, the actual yaw rate signal and the vehicle lateral acceleration signal; and integrating the yaw rate feedback signal and the side-slip rate feedback signal to generate a stability enhancement control signal used for providing the active front steering of the vehicle, wherein integrating the yaw rate feedback signal and the side-slip rate feedback signal includes weighting one or both of the yaw rate feedback signal and the side-slip rate feedback signal.

2. The method according to claim 1 wherein determining the yaw rate feedback signal includes determining whether the vehicle is in an understeer or oversteer condition, and wherein integrating the yaw rate feedback signal and includes weighting the yaw rate feedback signal based on whether the vehicle is in the understeer or the oversteer condition.

3. The method according to claim 1 wherein determining the side-slip rate feedback signal includes generating a side-slip error signal between the desired side-slip rate signal and an actual side-slip rate of the vehicle, and multiplying a side-slip control gain with the side-slip error signal.

4. The method according to claim 3 wherein the actual side-slip rate is determined from the lateral acceleration signal, the actual yaw rate signal and the vehicle speed signal.

5. The method according to claim 3 wherein determining the side-slip rate feedback signal includes determining an initial side-slip control gain signal, determining a control gain multiplier for an understeer and oversteer condition, and multiplying the understeer multiplier and the oversteer multiplier by the initial control gain signal.

6. The method according to claim 5 wherein the control gain multipliers are determined from look-up tables based on vehicle speed.

7. The method according to claim 1 wherein integrating the yaw rate feedback signal and the side-slip rate feedback signal includes determining whether a yaw rate error signal and the side-slip rate feedback signal are greater than predetermining thresholds for a predetermined period of time, wherein the yaw rate error signal is the difference between a yaw rate command and the actual yaw rate signal, and wherein if the yaw rate error signal and the side-slip rate feedback signal are not greater than the predetermined thresholds for the predetermined period of time, the side-slip rate feedback signal is set to zero.

8. The method according to claim 7 wherein integrating the yaw rate feedback signal and the side-slip rate feedback signal includes setting a yaw rate multiplier to one if the side-slip rate feedback signal or the yaw rate error signal is not greater than the predetermined threshold for the predetermined period of time.

9. The method according to claim 1 further comprising generating a variable gear ratio control signal based on the vehicle speed signal and the steering angle signal, and adding the variable gear ratio control signal to the stability enhancement control signal to control the front steering of the vehicle.

10. An active front steering system for a vehicle, said system comprising:
 a hand-wheel sensor for generating a steering angle signal indicative of a vehicle operator's intended steering direction;
 a vehicle speed sensor for providing a vehicle speed signal of the speed of the vehicle;
 a yaw rate sensor for providing an actual yaw rate signal of the yaw rate of the vehicle;
 a lateral acceleration sub-system for providing a lateral acceleration signal of the lateral acceleration of the vehicle;
 a yaw rate command sub-system responsive to the steering angle signal and the vehicle speed signal, said yaw rate command sub-system generating a desired yaw rate signal;
 a side-slip rate sub-system responsive to the steering angle signal and the vehicle speed signal, said side-slip rate sub-system generating a desired side-slip rate signal;
 a yaw rate feedback sub-system responsive to the desired yaw rate signal and the actual yaw rate signal, said yaw rate feedback sub-system generating a yaw rate feedback signal;
 a side-slip rate feedback sub-system responsive to the lateral acceleration signal, the actual yaw rate signal, the vehicle speed signal and the desired side-slip rate signal, said side-slip rate feedback sub-system providing a side-slip rate feedback signal; and
 a control integration sub-system responsive to the yaw rate feedback signal and the side-slip rate feedback signal, said control integration sub-system weighting the yaw rate feedback signal and/or the side-slip rate feedback signal to provide a stability enhancement control signal for controlling the front steering of the vehicle.

11. The system according to claim 10 wherein the yaw rate feedback sub-system determines whether the vehicle is in an understeer or oversteer condition, and wherein the control integration sub-system weights the yaw rate feedback signal based on whether the vehicle is in the understeer or the oversteer condition.

12. The system according to claim 10 wherein the side-slip rate feedback sub-system generates a side-slip error signal between the desired side-slip rate signal and an actual side-slip rate of the vehicle, and multiplies a side-slip control gain with the side-slip error signal.

13. The system according to claim 12 wherein the side-slip rate feedback sub-system determines the actual side-slip rate from the lateral acceleration signal, the actual yaw rate signal and the vehicle speed signal.

14. The system according to claim 13 wherein the side-slip rate feedback sub-system determines a side-slip control gain by providing an initial side-slip control gain signal, determining a control gain multiplier for an understeer and oversteer condition, and multiplying the understeer multiplier and the oversteer multiplier by the initial control gain.

15. The system according to claim 14 wherein the control gain multipliers are determined from look-up tables based on vehicle speed.

16. The system according to claim 10 wherein the control integration sub-system determines whether a yaw rate error signal and the side-slip rate feedback signal are greater than predetermining thresholds for a predetermined period of time, and wherein the yaw rate error signal is the difference between a yaw rate command and the actual yaw rate signal, and wherein if the yaw rate error signal and the side-slip feedback rate signal are not greater than the predetermined thresholds for the predetermined period of time, the side-slip rate feedback signal is set to zero.

17. The system according to claim 16 wherein the control integration sub-system sets a yaw rate multiplier to one if the side-slip rate feedback signal or the yaw rate error signal is not greater than the predetermined threshold for the predetermined period of time.

18. The system according to claim 10 further comprising a variable gear ratio sub-system that generates a variable gear ratio control signal based on the vehicle speed signal and the steering angle signal, and an adder for adding the variable gear ratio control signal to the stability enhancement control signal to control the front steering of the vehicle.

19. An active front steering system for a vehicle, said system comprising:
- a yaw rate feedback sub-system responsive to a desired yaw rate signal and an actual yaw rate signal, said yaw rate feedback sub-system generating a yaw rate feedback signal;
- a side-slip rate feedback sub-system responsive to a lateral acceleration signal, a the actual yaw rate signal, a vehicle speed signal and a desired side-slip rate signal, said side-slip rate feedback sub-system providing a side-slip rate feedback signal; and
- a control integration sub-system responsive to the yaw rate feedback signal and the side-slip rate feedback signal, said control integration sub-system weighting the yaw rate feedback signal and/or the side-slip rate feedback signal to provide a stability enhancement control signal for controlling the front steering of the vehicle.

20. The system according to claim 19 further comprising a variable gear ratio sub-system that generates a variable gear ratio control signal based on the vehicle speed signal and a steering angle signal, and an adder for adding the variable gear ratio control signal to the stability enhancement control signal to control the front steering of the vehicle.

* * * * *